United States Patent
Chae et al.

(10) Patent No.: US 9,838,975 B2
(45) Date of Patent: Dec. 5, 2017

(54) METHOD FOR DETERMINING TRANSMISSION POWER FOR DIRECT COMMUNICATION BETWEEN TERMINALS IN WIRELESS COMMUNICATION SYSTEM, AND APPARATUS FOR SAME

(71) Applicant: LG ELECTRONICS INC., Seoul (KR)

(72) Inventors: Hyukjin Chae, Seoul (KR); Hanbyul Seo, Seoul (KR); Joonkui Ahn, Seoul (KR); Byounghoon Kim, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/305,316

(22) PCT Filed: Apr. 20, 2015

(86) PCT No.: PCT/KR2015/003919
§ 371 (c)(1),
(2) Date: Oct. 19, 2016

(87) PCT Pub. No.: WO2015/163651
PCT Pub. Date: Oct. 29, 2015

(65) Prior Publication Data
US 2017/0041882 A1    Feb. 9, 2017

Related U.S. Application Data

(60) Provisional application No. 62/054,972, filed on Sep. 24, 2014, provisional application No. 62/027,260, (Continued)

(51) Int. Cl.
*H04W 52/18* (2009.01)
*H04W 52/36* (2009.01)
*H04W 92/18* (2009.01)

(52) U.S. Cl.
CPC ........... *H04W 52/18* (2013.01); *H04W 52/36* (2013.01); *H04W 92/18* (2013.01)

(58) Field of Classification Search
CPC ...... H04W 52/18; H04W 52/36; H04W 92/18
(Continued)

(56) References Cited

U.S. PATENT DOCUMENTS

2002/0141375 A1* 10/2002 Choi ................. H04W 16/14
370/347
2008/0233992 A1* 9/2008 Oteri ................. H04W 52/241
455/522

(Continued)

FOREIGN PATENT DOCUMENTS

KR    1020120074251    7/2012
KR    1020120112679    10/2012
KR    1020130048171    5/2013

OTHER PUBLICATIONS

PCT International Application No. PCT/KR2015/003919, Written Opinion of the International Searching Authority dated Aug. 18, 2015, 16 pages.

*Primary Examiner* — Tan H Trinh
(74) *Attorney, Agent, or Firm* — Lee Hong Degerman Kang Waimey

(57) ABSTRACT

Disclosed is a method for transmitting and receiving a signal by a device to device (D2D) terminal in a wireless communication system, according to an embodiment of the present invention, the method comprising the steps of: calculating a power headroom; and reporting the power headroom to a base station, wherein, if a terminal performs an uplink transmission to the base station on a first component carrier and performs a D2D transmission on a second component carrier, the terminal, when calculating the power headroom, considers transmission power related to a minimum coverage for D2D communication.

16 Claims, 15 Drawing Sheets

Related U.S. Application Data filed on Jul. 22, 2014, provisional application No. 61/981,846, filed on Apr. 20, 2014.

(58) Field of Classification Search
USPC .......... 455/452.2, 501, 522, 450, 41.1, 41.2; 370/252, 329, 241, 328, 336
See application file for complete search history.

(56) References Cited

U.S. PATENT DOCUMENTS

| | | | | |
|---|---|---|---|---|
| 2009/0232013 A1* | 9/2009 | Kumpula | ................ | H04K 3/65 370/252 |
| 2010/0093364 A1* | 4/2010 | Ribeiro | ............... | H04W 72/082 455/452.2 |
| 2011/0032890 A1* | 2/2011 | Wu | ........................ | H04L 5/001 370/329 |
| 2011/0319112 A1* | 12/2011 | Jeong | ................ | H04W 52/146 455/509 |
| 2012/0106477 A1* | 5/2012 | Kwon | ................ | H04W 52/365 370/329 |
| 2012/0243431 A1* | 9/2012 | Chen | ................ | H04W 72/0406 370/252 |
| 2012/0314640 A1* | 12/2012 | Kim | ........................ | H04L 5/001 370/311 |
| 2013/0070611 A1* | 3/2013 | Ahn | .................... | H04W 52/286 370/241 |
| 2013/0178221 A1* | 7/2013 | Jung | .................... | H04L 9/0844 455/450 |
| 2013/0223406 A1* | 8/2013 | Vujcic | .................... | H04L 5/001 370/331 |
| 2013/0250925 A1* | 9/2013 | Lohr | ................ | H04W 72/0446 370/336 |
| 2013/0286862 A1* | 10/2013 | Sartori | ................ | H04W 76/023 370/252 |
| 2013/0324182 A1* | 12/2013 | Deng | .................. | H04W 52/281 455/522 |
| 2014/0328329 A1* | 11/2014 | Novlan | ............... | H04W 72/042 370/336 |
| 2015/0031410 A1* | 1/2015 | Lim | .................... | H04W 52/146 455/522 |
| 2015/0156693 A1* | 6/2015 | Tabet | .................... | H04W 36/30 455/437 |
| 2015/0319703 A1* | 11/2015 | Kwon | ................ | H04W 52/146 370/329 |
| 2015/0327187 A1* | 11/2015 | Lu | ...................... | H04W 52/365 370/329 |
| 2016/0044552 A1* | 2/2016 | Heo | ...................... | H04W 4/008 370/331 |
| 2016/0242128 A1* | 8/2016 | Loehr | ................ | H04W 52/365 |

\* cited by examiner

FIG. 2
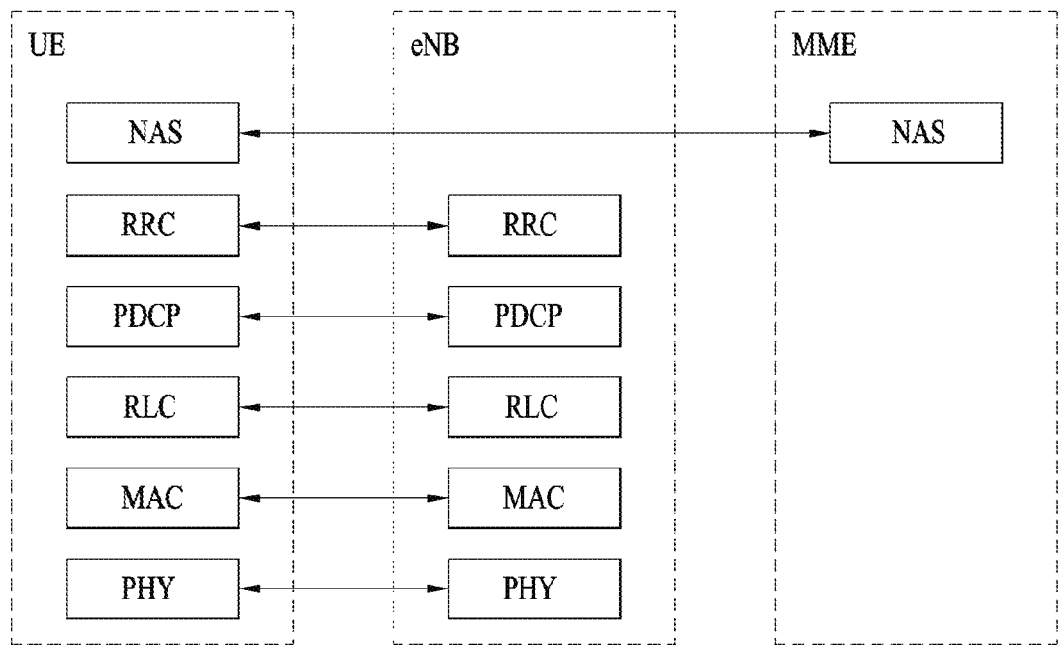
(a) control plane protocol stack
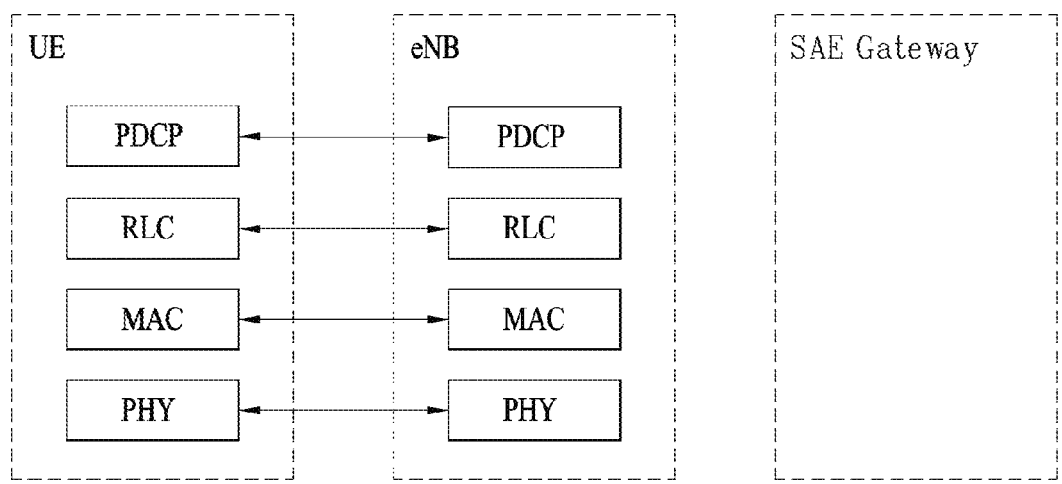
(b) user plane protocol stack

FIG. 19
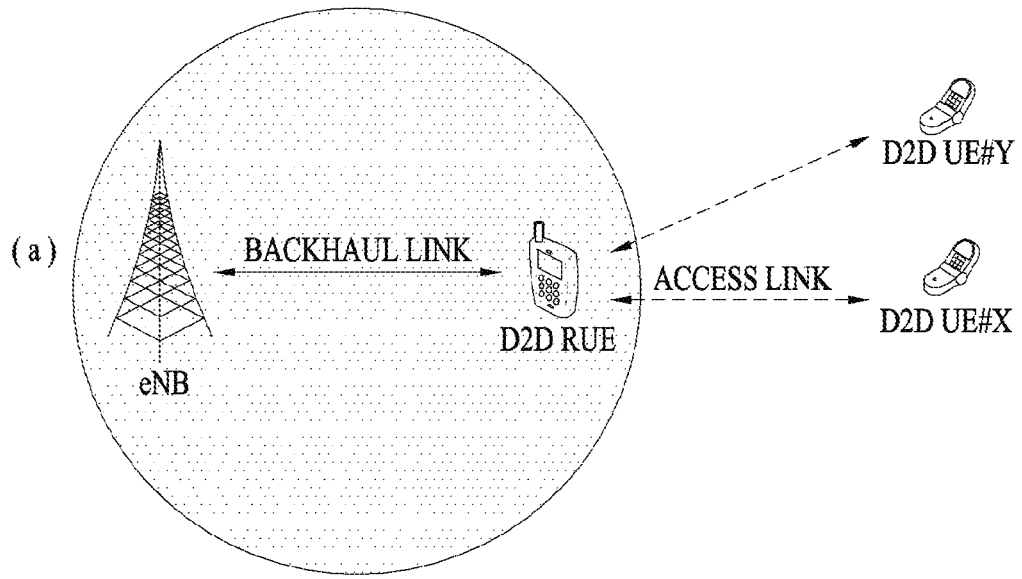
(a)
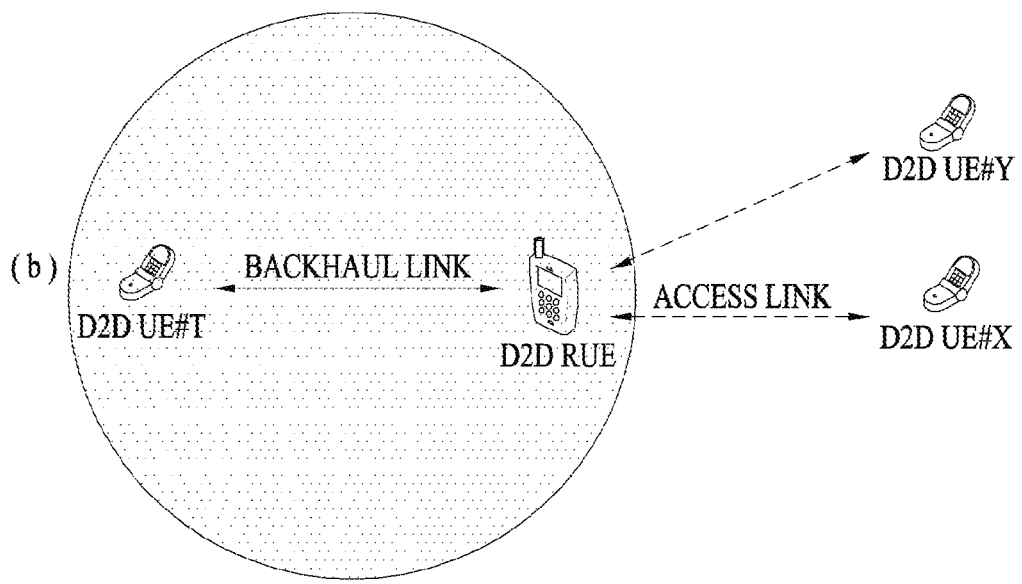
(b)

METHOD FOR DETERMINING TRANSMISSION POWER FOR DIRECT COMMUNICATION BETWEEN TERMINALS IN WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2015/003919, filed on Apr. 20, 2015, which claims the benefit of U.S. Provisional Application Nos. 61/981,846, filed on Apr. 20, 2014, 62/027,260, filed on Jul. 22, 2014, and 62/054,972, filed on Sep. 24, 2014, the contents of which are all hereby incorporated by reference herein in their entirety.

TECHNICAL FIELD

The present invention relates to a wireless communication system, and more particularly, to a method of determining transmit power for direct communication between terminals in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the present invention proposes a method of determining transmit power for direct communication between terminals in a wireless communication system and an apparatus therefor.

Technical Solution

To achieve these and other advantages and in accordance with the purpose of the present invention, as embodied and broadly described, according to one embodiment, a method of transmitting and receiving a signal, which is transmitted and received by a D2D (device to device) UE in a wireless communication system, includes the steps of calculating a power headroom and reporting the power headroom to an eNB. In this case, if the UE performs uplink transmission to the eNB on a first component carrier and performs D2D transmission on a second component carrier, the UE considers transmit power related to minimum coverage of D2D communication for calculating the power headroom.

To further achieve these and other advantages and in accordance with the purpose of the present invention, according to a different embodiment, a D2D (device to device) UE in a wireless communication system includes a transmit module and a processor, the processor configured to calculate a power headroom, the processor configured to report the power headroom to an eNB. In this case, if the UE performs uplink transmission to the eNB on a first component carrier and performs D2D transmission on a second component carrier, the UE considers transmit power related to minimum coverage of D2D communication for calculating the power headroom.

The embodiments of the present invention can include all or a part of items described in the following.

The method can further include the steps of receiving a TPC (transmit power control) command from the eNB and determining transmit power to be used on the first component carrier and the second component carrier based on the TPC command.

If the transmit power, which is determined based on the TPC command, to be used on the second component carrier is smaller than the transmit power related to the minimum coverage, the UE can perform transmission on the second component carrier according to the transmit power related to the minimum coverage.

If a signal transmitted on the first component carrier corresponds to a predetermined signal type, application of the transmit power related to the minimum coverage can be excluded.

The predetermined signal type can include PUCCH (physical uplink control channel), UCI (uplink control information), PRACH (physical random access channel), and a VoIP signal configured by SPS (semi persistent scheduling).

A size of the transmit power related to the minimum coverage may vary according to a signal type of the D2D transmission.

The size of the transmit power related to the minimum coverage can be determined by applying an offset to an average power value.

The offset may vary according to the signal type of the D2D transmission.

A size of the transmit power related to the minimum coverage can be determined by the UE in consideration of at least one of interference measured by the UE and a channel state with the D2D UE.

If the first component carrier and the second component carrier correspond to an intra-band, a difference between transmit power to be used on the first component carrier and transmit power to be used on the second component carrier may be equal to or less than a predetermined threshold.

If the first component carrier and the second component carrier correspond to an inter-band and a signal transmitted on the first component carrier corresponds to a predetermined signal type, a difference between transmit power to be used on the first component carrier and transmit power to be used on the second component carrier may be equal to or less than a predetermined threshold.

The predetermined signal type can include PUCCH, UCI, PRACH, and a VoIP signal configured by SPS.

The UE can report whether or not the D2D transmission is performed on the second component carrier to the eNB.

Advantageous Effects

According to embodiments of the present invention, it is able to efficiently determine transmit power between device-to-device communication and cellular communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a UE and an E-UTRAN based on the 3GPP radio access network specification;

FIG. 19 is a diagram for explaining D2D signal transmission and transmit power when carrier aggregation is applied according to embodiment of the present invention;

BEST MODE

Mode for Invention

Figure 1:
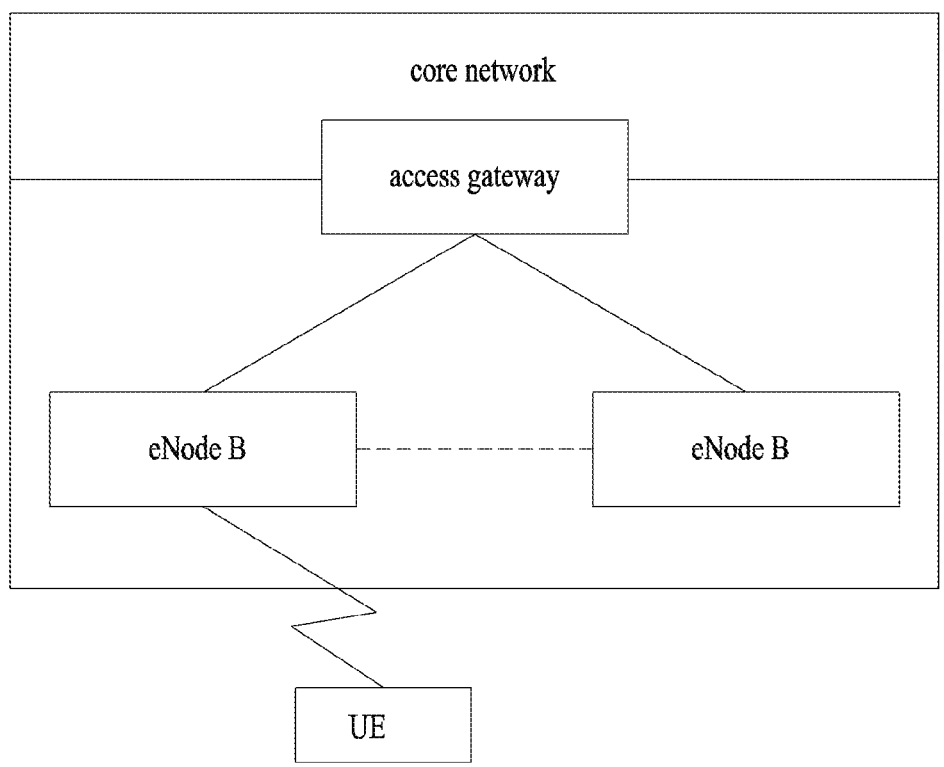
FIG. 1 is a diagram schematically illustrating a network structure of an E-UMTS as an exemplary radio communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
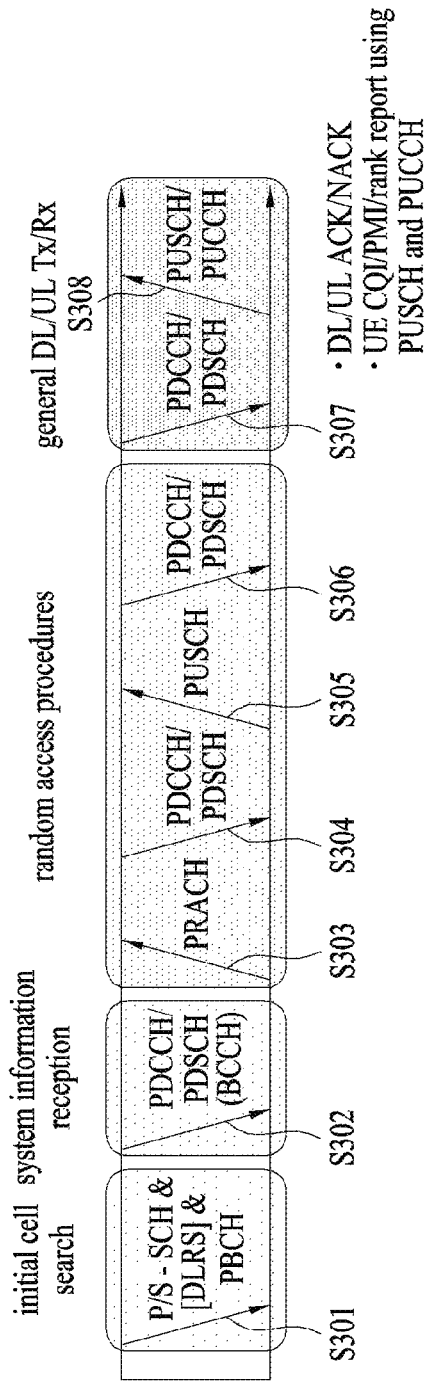
FIG. 3 is a diagram illustrating physical channels used in a 3GPP system and a general signal transmission method using the same.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
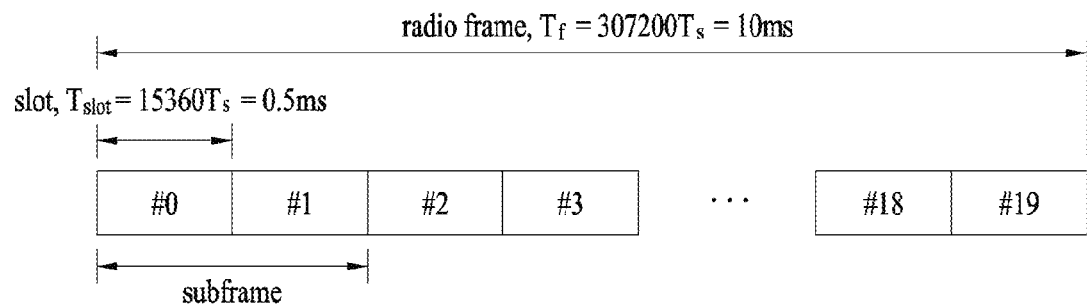
FIG. 4 is a diagram illustrating the structure of a radio frame used in an LTE system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15\ \text{kHz}\times2048)=3.2552\times10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
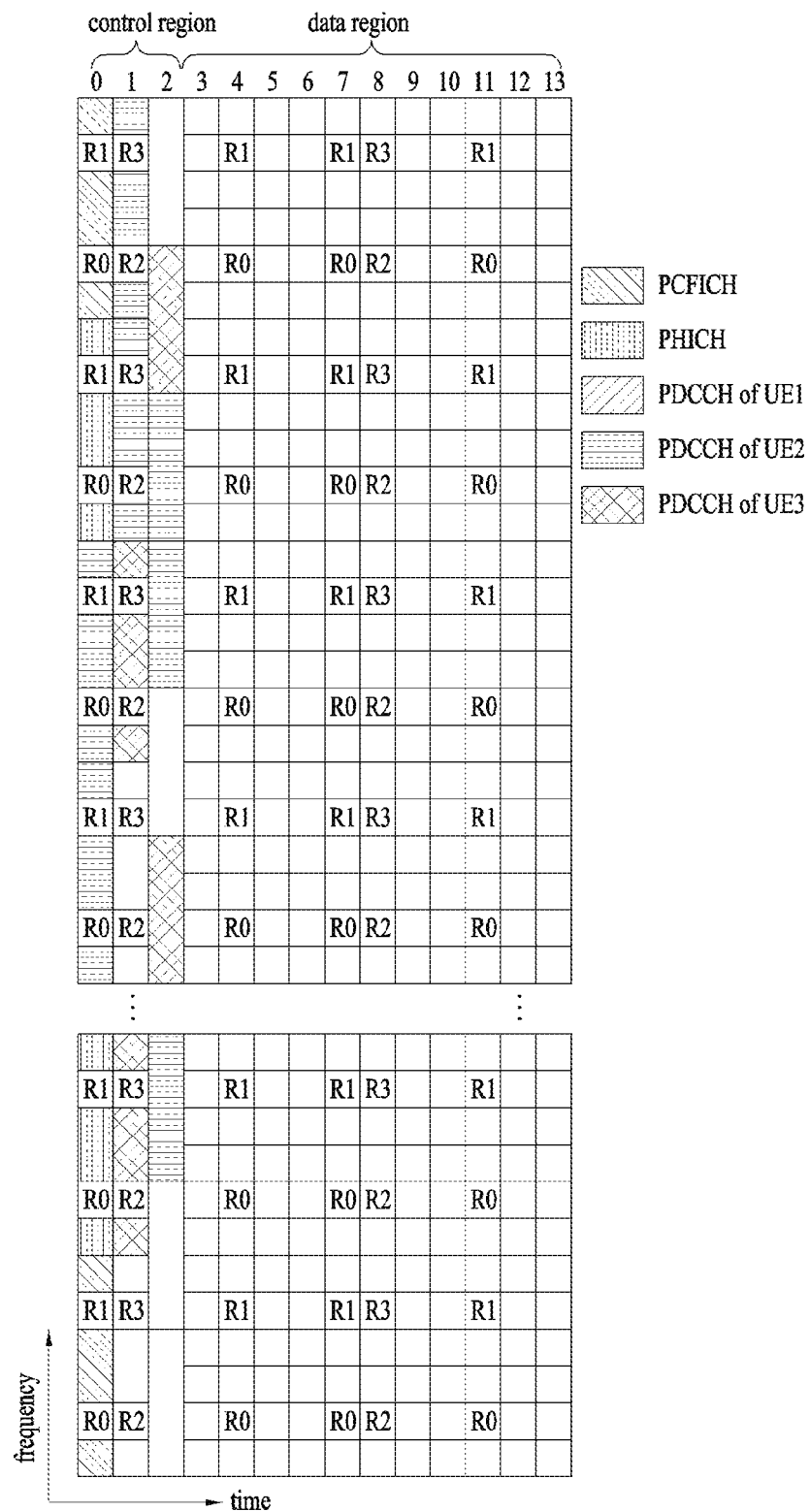
FIG. 5 is a diagram illustrating the structure of a DL subframe in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
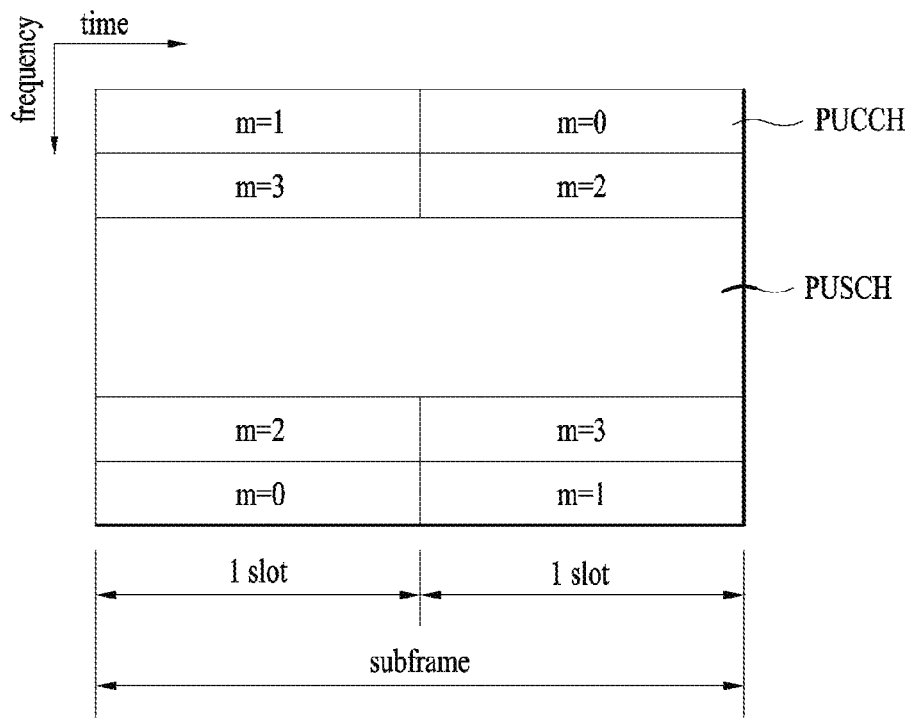
FIG. 6 is a diagram illustrating the structure of a UL subframe in an LTE system

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha_c \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe i−$K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 1.

TABLE 1

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 2 or one of SET2 of Table 3, determined by a TPC-index parameter provided by the higher layer.

TABLE 2

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(k) = \min\begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases} [dBm]$$

[Equation 3]

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{0\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 4 and 5 show $\delta_{PUCCH}$ indicated by a TPC command in DCI formats. Particularly, Table 4 shows $\delta_{PUCCH}$ indicated in DCI formats other than DCI format 3A and Table 5 shows $\delta_{PUCCH}$ indicated in DCI format 3A.

TABLE 4

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 5

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min\begin{Bmatrix} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{Bmatrix} [dBm]$$ [Equation 4]

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Figure 7:
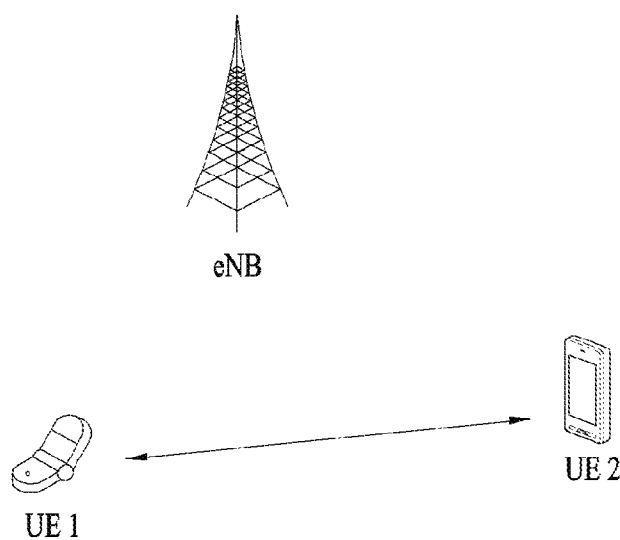
FIG. 7 is a conceptual diagram for a direct communication between UEs.

FIG. 7 is a conceptual diagram for a direct communication between UEs.

Referring to FIG. 7, when a UE directly performs communication with a different UE, i.e., D2D (device-to-device) communication, an eNB can transmit a scheduling message for controlling D2D transmission and reception to the UE. A UE participating in the D2D communication receives a D2D scheduling message form the eNB and performs a transmission and reception operation indicated by the D2D scheduling message. In this case, although the UE corresponds to a terminal of a user, if such a network entity as an eNB transmits and receives a signal according to a communication scheme between UEs, the network entity can also be considered as a sort of UEs. In the following, a link directly connected between UEs is referred to as a D2D link and a link used for a UE to communicate with an eNB is referred to as an NU link.

Since D2D communication uses an uplink resource used for a UE to perform transmission, the D2D communication transceive interference with legacy communication (hereinafter, WAN communication) such as PUCCH or PUSCH transmitted to an eNB by the UE. In general, the WAN communication performs power control according to a channel state with an eNB. Hence, when a channel state with the eNB becomes poor, a main purpose of the WAN communication is to make a WAN signal arrive at the eNB with a minimum necessary level by increasing transmit power. On the contrary, although the D2D communication is performed within coverage of the eNB, a reception target of a signal of the D2D communication is not the eNB. Hence, power control for securing quality of a reception signal may be inappropriate. In particular, in case of performing broadcast or groupcast that a D2D signal is received by a plurality of reception UEs, the power control becomes more inappropriate. In this case, if D2D power is controlled by an eNB to control interference between a WAN communication signal and a D2D communication signal, it might be more appropriate.

In particular, the eNB does not control transmit power based on reception quality of a D2D signal and the eNB is configured to have coverage as wide as possible (e.g., it may be able to configure maximum transmit power of D2D). If the eNB examines strong interference from specific D2D commination, the eNB can indicate to reduce power of the D2D communication via a TPC (transmit power control) command and the like. If interference of the specific D2D communication affecting other WAN communication is low enough, the eNB can also indicate the specific D2D communication to increase transmit power.

While the aforementioned operation is performed, minimum coverage of the D2D communication should be secured. To this end, the eNB can configure minimum transmit power of the D2D communication. The minimum transmit power may have a value higher than a minimum power value capable of being applied to signal transmission transmitted by a UE. When a D2D signal is transmitted, if power lower than a minimum D2D transmit power is used, it may indicate that minimum performance of the D2D communication is not secured. As a result, it can be interpreted as a time/frequency resource used by the D2D signal is wasted. Hence, although an eNB indicates to lower transmit power of D2D via a TPC command, if the transmit power according to the indication is equal to or lower than minimum transmit power configured by the eNB, it may perform an operation of using the minimum transmit power configured by the eNB instead of the power value according to the TPC command.

In particular, the operation can be effective when the eNB uses an accumulated TPC command of a form indicating to increase or decrease transmit power as much as a predetermined level on the basis of a current value. Typically, since coverage of a D2D communication channel varies according to MCS (modulation and coding scheme) used by the channel, the number of RBs used by the channel, and the count of repeatedly transmitting identical data, minimum D2D transmit power can be configured to have a different value depending on the MCS, the number of RBs, and/or the count of repeatedly transmitting the same data.

Figure 8:
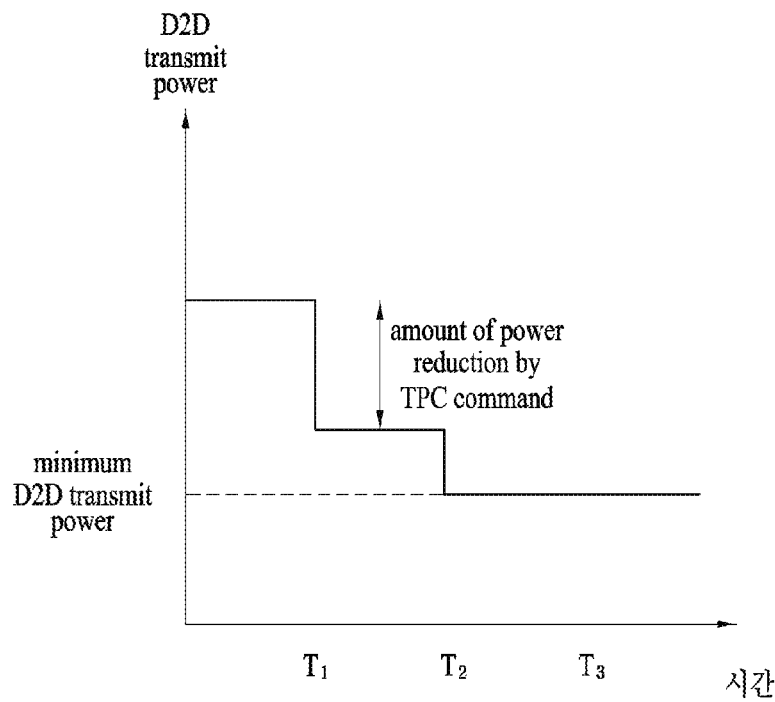
FIG. 8 is a diagram for an example of a minimum D2D transmit power configured according to embodiment of the present invention.

FIG. 8 is a diagram for an example of a minimum D2D transmit power configured according to embodiment of the present invention.

Referring to FIG. 8, although a UE has received a TPC command for indicating power to be reduced as much as a predetermined size at timings $T_1$, $T_2$ and $T_3$, since the power becomes minimum D2D transmit power at the timing $T_2$, the UE is unable to reduce the power anymore. Or, as a variation of the case shown in FIG. 8, when the UE follows the TPC command indicated by the eNB, if D2D transmit power becomes equal to or lower than the minimum D2D transmit power, D2D transmission is practically regarded as meaningless and the D2D transmission can be cancelled.

Meanwhile, the aforementioned minimum D2D transmit power can be determined by a UE as well. In particular, the D2D transmit power determined by the UE can be more effective for unicast performed for a specific UE only. A transmission UE can configure minimum D2D transmit power necessary for obtaining communication quality of a preferred level in consideration of an interference level examined by the transmission UE or a channel state with a reception UE. If the eNB is aware of the minimum D2D transmit power determined by the transmission UE, it will be helpful for controlling D2D transmit power. Hence, the UE can report the minimum D2D transmit power determined by the UE to the eNB. If the minimum D2D transmit power determined by the UE becomes greater than maximum D2D transmit power granted by the eNB, the UE stops performing the D2D transmission and may be able to report the termination to the eNB.

Meanwhile, the eNB can smoothly control D2D transmit power only when the eNB knows power status of each D2D transmission UE. In particular, when the eNB examines strong interference from a D2D signal of a specific UE, the eNB can indicate the specific UE to reduce transmit power of the specific UE. Yet, the indication can be effective only when the specific UE is able to reduce D2D transmit power more. As an example, if a minimum D2D transmit power is configured and the UE transmits D2D with a power level similar to a level of the minimum D2D transmit power, the indication for reducing transmit power is not helpful for reducing interference. If the eNB is able to identify the above-mentioned fact, the eNB may be able to move D2D transmission of the UE using a resource less sensitive to interference or terminate the D2D transmission of the UE and may be then able to indicate the UE to switch to WAN communication. To this end, each D2D transmission UE can report an amount of power of a D2D transmission signal capable of being reduced by the D2D transmission UE to the eNB (hereinafter, this is defined as a power footroom report).

As an example, the UE calculates a difference between D2D transmit power currently used by the UE (transmit power most recently used for transmission) and minimum D2D transmit power capable of transmitting a D2D signal and may be then able to report the difference to the eNB. In some cases, D2D transmit power may change even though there is no TPC command from the eNB. As an example, a D2D data channel on which user data is transmitted and a D2D SA (D2D scheduling assignment) channel on which various information on a following D2D data channel may have different transmit power. In this case, one of the two channels may become a reference (preferably, the SA channel always becomes a reference since one transmission failure on the channel brings about bigger resource waste) or one channel of which transmit power is lower among the two channels may become a reference.

Figure 9:
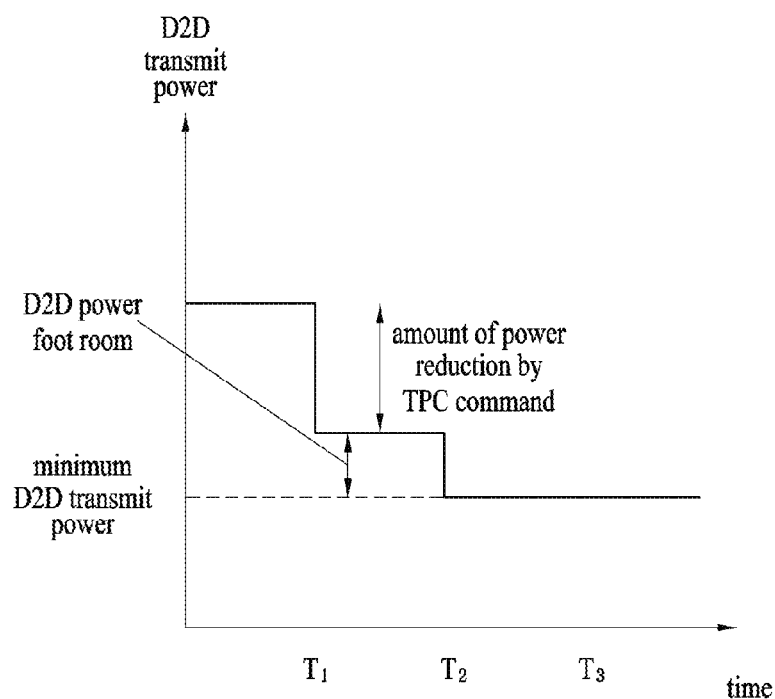
FIG. 9 is a diagram for an example of reporting a power footroom in an operation of FIG. 8.

FIG. 9 is a diagram for an example of reporting a power footroom in an operation of FIG. 8.

Referring to FIG. 9, it is able to see that a difference between actual D2D transmit power and minimum D2D transmit power between time $T_1$ and time T2 is reported by a power footroom. In addition, the UE can report an amount of power capable of being reduced by the UE while maintaining coverage preferred by the UE in case of changing MCS used by the UE. Having received the report, the eNB is able to set appropriate MCS to the UE.

In calculating a power footroom for D2D communication, as mentioned earlier in the example of FIG. 8, minimum D2D transmit power may correspond to minimum power used for actual D2D transmission or simply correspond to a value nominally designated to report the power footroom (e.g., a value signaled by the eNB). If the nominal minimum D2D transmit power is given, although D2D transmit power indicated by the eNB via a TPC command becomes smaller than the nominal minimum D2D transmit power, the UE configures the D2D transmit power according to the indication of the eNB. This operation is different from an operation shown in FIG. 9.

Figure 10:
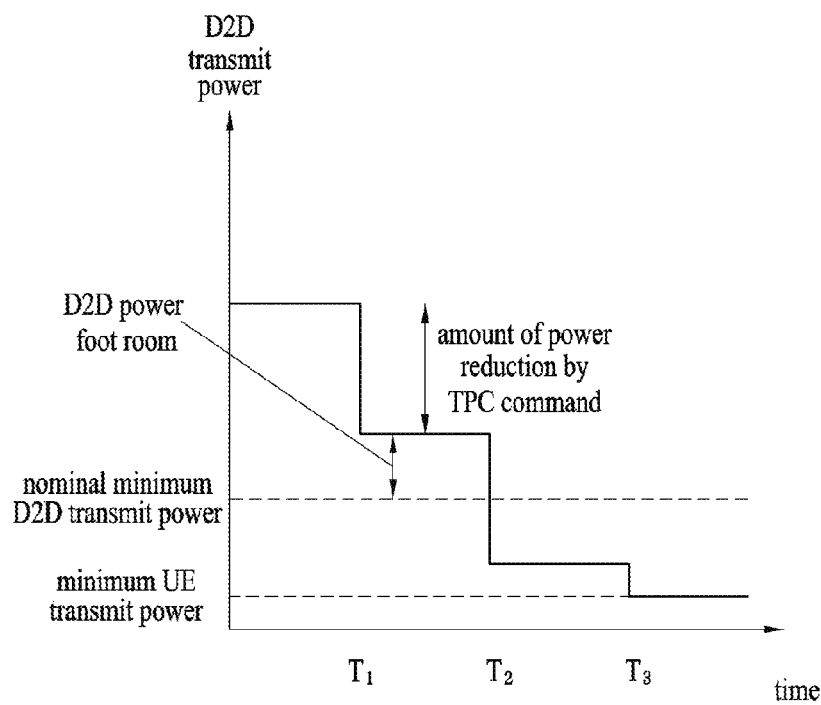
FIG. 10 is a diagram for an example of reporting a power footroom when a minimum D2D transmit power is nominally provided according to embodiment of the present invention.

FIG. 10 is a diagram for an example of reporting a power footroom when a minimum D2D transmit power is nominally provided according to embodiment of the present invention.

Referring to FIG. 10, D2D signal transmission of a value smaller than the nominal minimum D2D transmit power occurs according to a TPC command at the time $T_2$. When the UE receives a TPC command at time $T_3$, the UE arrives at minimum power capable of being used for D2D transmission by the UE. Hence, the UE is unable to reduce power anymore and transmits a D2D signal with the minimum power. Of course, the nominal minimum D2D transmit power can be configured by the minimum power capable of being transmitted by the UE.

The aforementioned power footroom for D2D communication is not reported to the eNB all the time. Instead, the power footroom is reported to the eNB only when a specific condition is satisfied to reduce signaling overhead according to the power footroom. As an example, if the power footroom becomes equal to or less than a predetermined level, the UE reports the power footroom to the eNB to indicate that there is not much D2D transmit power capable of being reduced by the UE left. And, if the power footroom becomes smaller than a predetermined level and then the power footroom becomes greater than the predetermined level by a TPC command, the UE can report it to the eNB to inform the eNB that the UE is now has sufficient power footroom.

Figure 11:
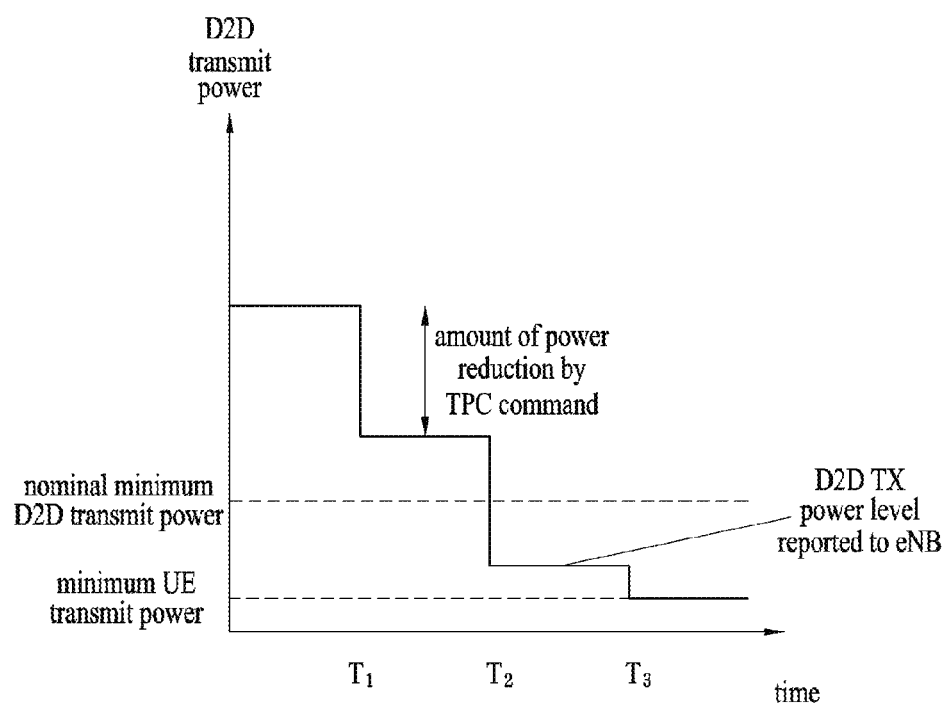
FIG. 11 is a diagram for an example of reporting D2D transmit power itself according to embodiment of the present invention.

As a variation of the power footroom report for D2D communication, the UE can simply report currently used D2D transmit power itself to the eNB instead of a difference between the currently used D2D transmit power and minimum D2D transmit power. FIG. 11 is a diagram for an example of reporting D2D transmit power itself according to embodiment of the present invention.

Referring to FIG. 11, if actual D2D transmit power becomes smaller than the nominal minimum D2D transmit power configured by the eNB, the UE can report the currently used D2D transmit power to the eNB. This reporting operation can be triggered between the timing $T_2$ and the timing $T_3$. Subsequently, if the UE receives a TPC command indicating to increase the D2D transmit power and the D2D transmit power becomes equal to or greater than the nominal minimum transmit power again, the UE can inform the eNB of the fact.

Figure 12:
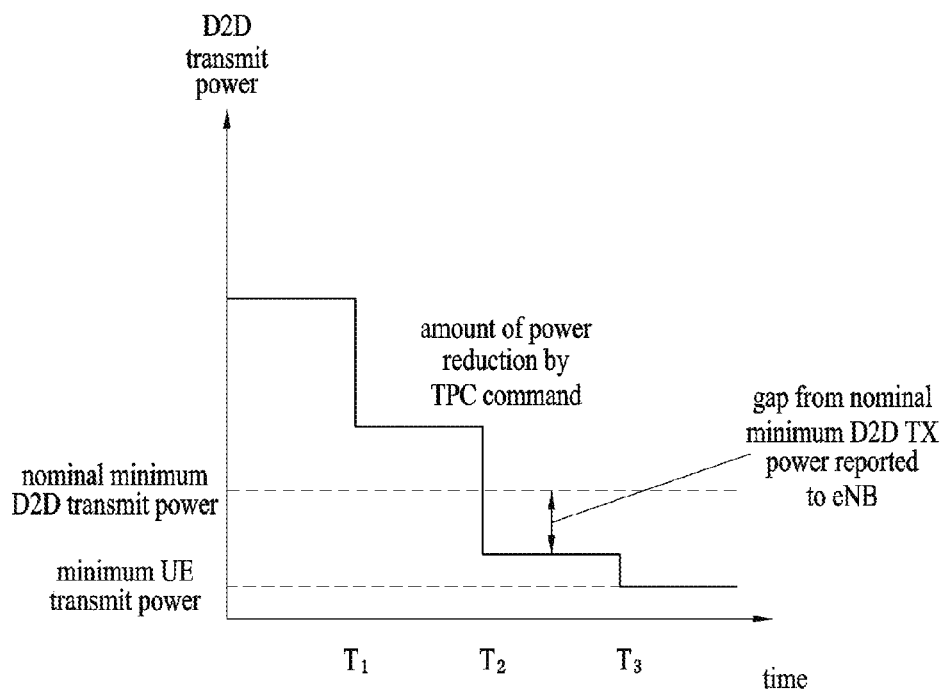

Or, as a variation of the operation mentioned earlier in FIG. 11, if the D2D transmit power becomes smaller than the nominal minimum D2D transmit power, the UE can report a difference between the D2D transmit power and the nominal minimum D2D transmit power to the eNB. FIG. 12 is a diagram for an example of reporting a difference between the D2D transmit power and the nominal minimum D2D transmit power.

A different example of an operation for controlling transmit power controlled by the eNB is explained in the following. According to the operation, a transmit power value configured by the eNB via a TPC or the like corresponds to maximum transmit power capable of being used by the UE for D2D transmission. Actual transmit power practically used by the UE for various purposes may become a value smaller than the value configured by the eNB. As an example, if a transmission UE has a small amount of data to be transmitted, the transmission UE can configure D2D transmit power of the transmission UE with a value smaller than the value configured by the eNB to reduce interference influencing on different D2D communication or WAN communication while performing communication by lowering MCS. As a different example, the transmission UE can configure D2D transmit power of the transmission UE with a value smaller than the value configured by the eNB to reduce power consumption of the transmission UE.

Figure 13:
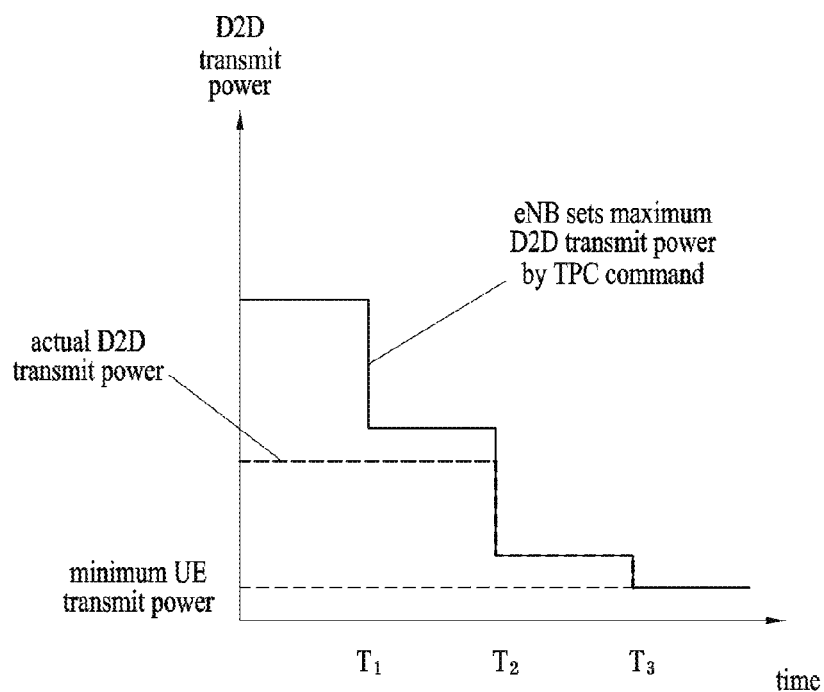
FIG. 13 is a diagram for a different example of an operation of controlling transmit power of D2D communication controlled by an eNB according to embodiment of the present invention.

FIG. 13 is a diagram for a different example of an operation of controlling transmit power of D2D communication controlled by an eNB according to embodiment of the present invention.

Referring to FIG. 13, a UE receives a TPC command at timing $T_1$, timing $T_2$, and timing $T_3$ and an upper limit of transmit power of each transmission timing is set to the UE. The UE selects appropriate transmit power equal to or less than the upper limit of the transmit power and transmits a D2D signal. Of course, if necessary, the UE may use the upper limit of the transmit power configured by the eNB. Referring to FIG. 13, the UE uses transmit power smaller than the upper limit configured by the eNB until the timing $T_2$. After the timing $T_2$, since the maximum value configured by the eNB become very small, the UE performs actual transmission using the upper limit.

The operation mentioned earlier in FIG. 13 is effective in that the UE provides a room capable of additionally reducing D2D transmit power according to a situation of the UE. Yet, in terms of the eNB, it is difficult for the eNB to anticipate a level of interference to be actually generated by D2D transmission due to the additionally reduced D2D transmit power. For example, if a specific UE uses transmit power considerably lower than the upper limit configured by the eNB, the eNB, which is unaware of the considerably lower transmit power, determines it as interference from the UE is less. Hence, the eNB can transmit a TPC command for granting a higher limit to the UE. If the UE suddenly uses the granted upper limit as it is, the eNB may receive unexpected strong interference. In order to prevent the aforementioned problem, although a D2D UE is able to autonomously configure transmit power equal to or less than a upper limit value configured by the eNB, there may exist a lower limit value appropriate for actual transmit power capable of being used.

Specifically, the eNB separately configures a lower limit value of D2D transmit power and it may be able to configure power capable of being actually used by the UE for transmission to exist between an upper limit configured by a TPC command and the separately configured lower limit. If the upper limit configured by the TPC command becomes smaller than the separately configured lower limit, the UE determines it as D2D transmission is impossible and may be able to terminate the D2D transmission. The UE can report the fact to the eNB.

Figure 14:
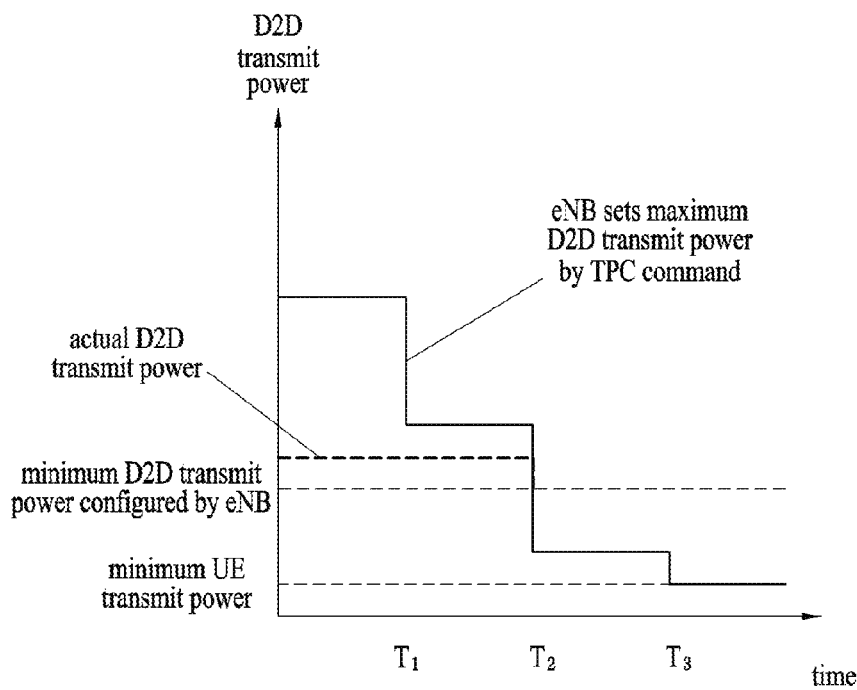
FIG. 14 is a diagram for an example of configuring both an upper limit and a lower limit of D2D transmit power according to embodiment of the present invention.

FIG. 14 is a diagram for an example of configuring both an upper limit and a lower limit of D2D transmit power according to embodiment of the present invention. The example shown in FIG. 14 shows that the UE terminates D2D transmission after the timing $T_2$.

As a different method of configuring a lower limit value appropriate for actual transmit power capable of being used by a UE, it may be able to induce a lower limit by placing a predetermined offset on an upper limit configured by a TPC command. In this case, the eNB is able to identify a fact that the UE is transmitting D2D within the offset on the basis of at least a current TPC command.

Figure 15:
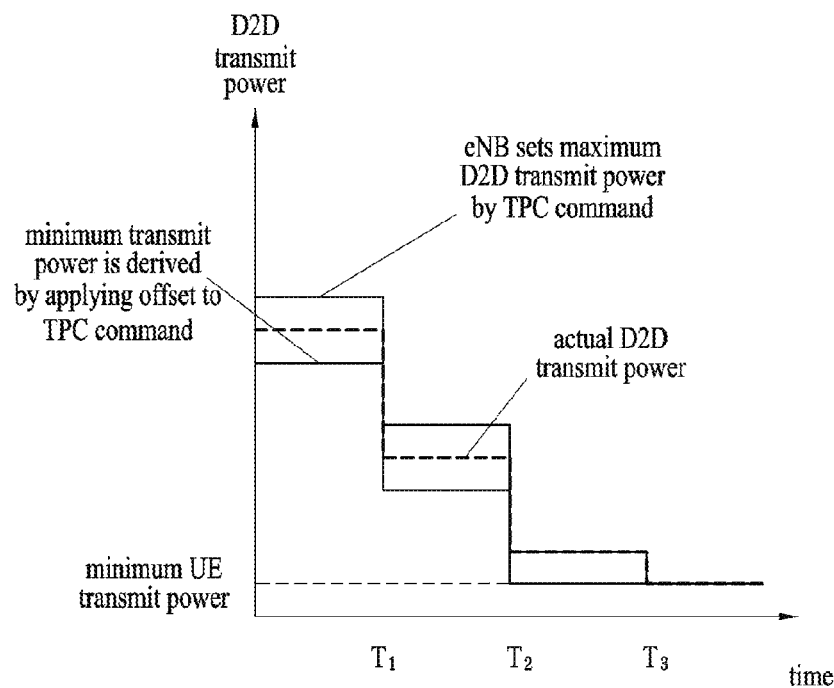
FIG. 15 is a diagram illustrating that a UE configures a value configured by a TPC command as an upper limit, configures a lower limit by applying an offset to the upper limit, and selects transmit power to be used for actual D2D transmission within a range between the upper limit and the lower limit.

FIG. 15 is a diagram illustrating that a UE configures a value configured by a TPC command as an upper limit, configures a lower limit by applying an offset to the upper limit, and selects transmit power to be used for actual D2D transmission within a range between the upper limit and the lower limit.

Referring to FIG. 15, the UE configures a value configured by a TPC command as an upper limit and configures a lower limit by applying an offset to the value. The UE selects transmit power to be used for actual D2D transmission within a range between the upper limit and the lower limit.

As a further different method, when the UE receives a TPC command capable of increasing D2D transmit power from the eNB and interprets the TPC command, an upper limit of the D2D transmit power can be updated only when a value resulted from adding an increment of the TPC command to actual transmit power of D2D exceeds the upper limit previously configured by the eNB.

More specifically, the upper limit of the D2D transmit power at timing i+1 can be given as equation 5 in the following.

$$P_{D2D,max}(i+1) = \max\{P_{D2D,max}(i), P_{D2D,used}(i) + TPC(i)\} \quad \text{[Equation 5]}$$

In equation 5, $P_{D2D,used}(i)$ corresponds to a power value actually used for D2D at the timing i. Or, if D2D transmission is not performed at the timing i, a power value used for D2D transmission at previous timing closest to the timing i. And, TPC(i) corresponds to an increment of power increased by a TPC command received at the timing i. In this case, since the TPC(i) corresponds to a TPC command for increasing power, it satisfies a condition of TPC(i)>=0. Consequently, it may be able to obtain an effect of controlling the upper limit of D2D based on current D2D transmit power according to the equation 5.

Meanwhile, if the eNB indicates to reduce D2D transmit power via a TPC command, it is considered as interference from actual D2D transmit power is excessive. In this case, an upper limit value of a D2D signal is updated on the basis of actual D2D transmit power rather than a legacy upper limit value. More specifically, the upper limit of the D2D transmit power at timing i+1 can be given as equation 6 in the following.

$$P_{D2D,max}(i+1) = P_{D2D,used}(i) + TPC(i) \quad \text{[Equation 6]}$$

In equation 6, TPC(i) corresponds to an increment of power increased by a TPC command received at the timing i. In this case, since the TPC(i) corresponds to a TPC command for decreasing power, it satisfies a condition of TPC(i)<0.

According to the characteristics of the aforementioned D2D transmit power control, controlling power of a D2D signal is important to reduce interference from WAN. Hence, when a TPC command is configured, an operation of reducing power can be regarded as more important than an operation of increasing power. This is because, if interference caused by a specific D2D UE is considerably strong, it is necessary for the eNB to quickly reduce D2D power of the UE. As an example, when a TPC is prepared for WAN transmission, it may be able to assign more states among a plurality of states indicated by a TPC command to reduce power or it may increase a step size itself for reducing transmit power.

Table 6 in the following corresponds to an example indicating a D2D transmit power adjustment value in case of using a TPC command of 2 bits. Or, a transmit power adjustment value to be used in each state of a TPC command for D2D can be configured by such a higher layer signal as RRC to reflect various requirements.

TABLE 6

| TPC Command Field in DCI controlling D2D transmissions | Accumulated $\delta_{PUSCH,c}$ [dB] | Absolute $\delta_{PUSCH,c}$ [dB] |
|---|---|---|
| 0 | −3 | −7 |
| 1 | −1 | −4 |
| 2 | 0 | −1 |
| 3 | 1 | 1 |

Of course, in order to more smoothly control D2D transmit power, more bits can be assigned as a D2D TPC compared to WAN communication. In this case, more states can be assigned for the purpose of reducing power. As an example, as shown in Table 7 in the following, if a TPC command of 3 bits is included in a DCI for controlling D2D transmission, it may be able to utilize more states to indicate power to be reduced.

TABLE 7

| TPC Command Field in DCI controlling D2D transmissions | Accumulated $\delta_{PUSCH,c}$ [dB] | Absolute $\delta_{PUSCH,c}$ [dB] |
|---|---|---|
| 0 | −7 | −16 |
| 1 | −5 | −13 |
| 2 | −3 | −10 |
| 3 | −1 | −7 |
| 4 | 0 | −4 |
| 5 | 1 | −1 |
| 6 | 3 | 1 |
| 7 | 5 | 4 |

Meanwhile, the TPC command can be transmitted as a partial field of a D2D grant for transmitting various indications to the D2D transmission UE. The TPC command is transmitted on PDCCH or EPDCCH (enhanced PDCCH). In this case, a transmission UE targets a plurality of UEs (or a plurality of UE groups) as reception UEs and may be able to transmit a D2D signal to the UEs. As an example, a UE1 can transmit a different D2D signal to each of a UE2 and a UE3 according to indication received via a D2D grant. In this case, various information of the D2D grant indicated by the eNB may vary depending on a target reception UE. As an example, if the UE2 is located near the UE1, an amount of resources and transmit power utilized for performing transmission to the UE2 are reduced. On the contrary, if the UE3 is far from the UE1, it may be able to configure many resources to be used.

In order to provide the aforementioned operation, when a D2D signal is transmitted by applying a D2D grant, information on a target reception UE of the D2D signal can be included in the D2D grant. As an example, the D2D grant includes a specific indicator and the specific indicator can indicate a UE to which a D2D signal is transmitted among the UE2 and the UE3. In this case, if a reception target UE is differentiated due to a different indicator, since appropriate transmit power is differentiated, it is preferable to separately manage a TPC as well.

In addition, the eNB can separately inform each indicator of maximum/minimum D2D transmit power and a power control parameter to be used in each indicator (i.e., a reception UE group corresponding to an indicator) via such a higher layer signal as RRC. Measurement and reporting of a power footroom can also be performed according to each reception UE group.

In the following, a method of configuring minimum D2D transmit power to secure minimum coverage of the D2D communication is explained in more detail.

Minimum coverage of each D2D communication may vary depending on a service performed by a transmission UE. As an example, when UEs transmit a discovery signal to notify the existence of the UEs, a UE1 may want UEs very close to the UE1 to discover the UE1. On the contrary, a UE2 may want a UE far from the UE2 as well as UEs close to the UE2 to discover the UE2. This indicates that minimum coverage of a discovery signal of the UE1 and minimum coverage of a discovery signal of the UE2 are different from each other. Hence, minimum transmit power of the discovery signals of the two UEs can be separately configured.

An eNB can separately signal minimum transmit power in consideration of minimum coverage of a D2D signal of each UE. Yet, in case of a part of D2D signals (e.g., a D2D signal transmitted by a UE by autonomously selecting a specific resource from a resource pool set to a plurality of unspecified UEs by the eNB), it may be difficult to perform UE-dedicated signaling. In this case, the eNB separately configures a resource pool according to coverage to be secured and the eNB can configure minimum transmit power in accordance with coverage secured for each resource pool. In this case, if a specific UE uses excessively high transmit power in a specific resource pool, it may cause considerably strong interference to other UEs. Hence, it may also be able to configure maximum transmit power for target coverage of each resource pool.

In particular, target coverage of a D2D signal appears as a sort of transmit power sections represented by minimum transmit power and/or maximum transmit power. If transmit power of a different section is used in a different resource pool, it indicates that it is able to easily provide target coverage in each section.

Figure 16:
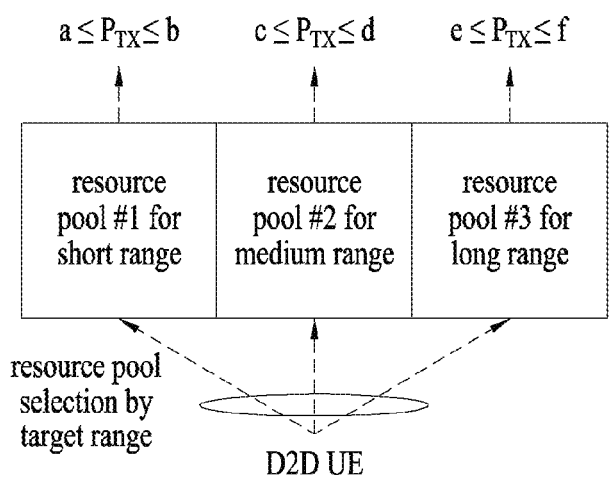
FIG. 16 is a diagram for an example of using transmit power of a different section for each of resource pools to perform D2D communication according to embodiment of the present invention.

FIG. 16 is a diagram for an example of using transmit power of a different section for each of resource pools to perform D2D communication according to embodiment of the present invention.

Referring to FIG. 16, three resource pools in total are configured and each of the resource pools targets a short range, a medium range, and a long range, respectively. In this case, such relationship as a≤c≤e, b≤d≤f can be established between minimum D2D transmit power and maximum D2D transmit power in each resource pool.

As an example of interlocking the minimum/maximum D2D transmit power with target coverage of D2D communication, it may be able to determine nominal D2D transmit power corresponding to D2D coverage and a UE is able to use a resource pool of a transmit power region including the nominal D2D transmit power.

As a different example, if each resource pool has nominal D2D transmit power, a UE transmitting a D2D signal of the nominal D2D transmit power can select a pool of the same nominal power. In this case, minimum and/or maximum D2D transmit power of the resource pool can be induced from the nominal D2D transmit power. For example, it is able to configure the minimum D2D transmit power and the maximum D2D transmit power to be X ($\leq$100) % and Y ($\geq$100) % of the nominal power, respectively.

Specifically, since the nominal power corresponds to minimum D2D transmit power, coverage provided by the nominal D2D transmit power can be configured as minimum coverage.

Subsequently, if a UE selects a specific resource pool to perform D2D signal transmission, minimum and/or maximum power of the UE is determined. The UE performs D2D power control within a range between the maximum power and the minimum power according to the aforementioned operation and final D2D transmit power is determined. In this case, it is preferable to separately configure various power control parameters (e.g., a weighted value multiplied by pathloss with an eNB) applied in each resource pool. And, the count of repeatedly transmitting an identical D2D signal can also be appropriately configured in each resource pool based on target coverage of D2D communication. This is because, if the identical D2D signal is more frequently transmitted, although identical power is used, the coverage becomes wider.

Referring to equation 1, like a discovery signal of D2D communication, if the number of resource blocks occupied by a D2D signal or a modulation scheme used by the D2D signal is fixed and there is no TPC command of an eNB, consequently, $P_{O\_PUSCH,c}(j)$ corresponds to minimum D2D transmit power configured by the eNB and a UE transmits D2D with power equal to or greater than minimum power according to pathloss with the eNB within a range of determined maximum power $P_{CMAX,c}(i)$. Hence, as shown in FIG. 16, when target D2D coverage according to a resource pool is configured and minimum/maximum transmit power is determined according to each resource pool, it can be implemented in a form of configuring a value corresponding to $P_{O\_PUSCH,c}(j)$ and a value corresponding to $P_{CMAX,c}(i)$, respectively, according to each resource pool.

In the following, a method of determining transmit power and signal transmission and reception are explained when carrier aggregation is applied. Specifically, a method of determining transmit power of a relay UE in a UE relay operation (this UE is referred to as a D2D RUE) in D2D communication is disclosed.

Prior to the explanation on the method, carrier aggregation in legacy LTE system is explained with reference to FIGS. 17 to 18 in the following.

Figure 17:
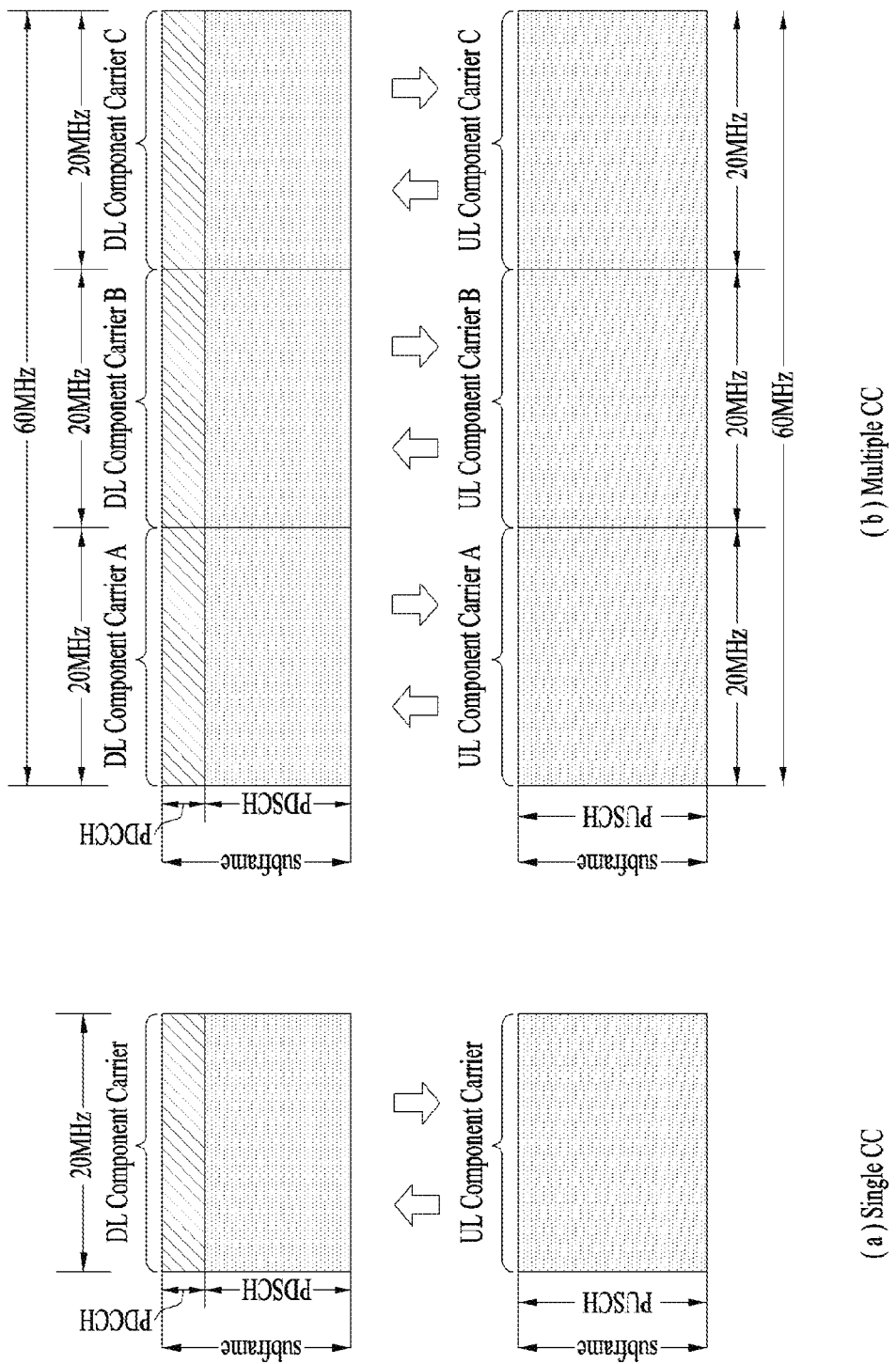
FIGS. 17 to 18 are diagrams for explaining carrier aggregation.

FIG. 17 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A downlink component carrier (DL CC) and an uplink component carrier (UL CC) may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 17. CA is a technology introduced to use a wider band to meet demands for a high transmission rate. CA can be defined as aggregation of two or more component carriers (CCs) having different carrier frequencies. FIG. 17 (a) shows a subframe when a conventional LTE system uses a single CC and FIG. 17 (b) shows a subframe when CA is used. In FIG. 17 (b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 18:
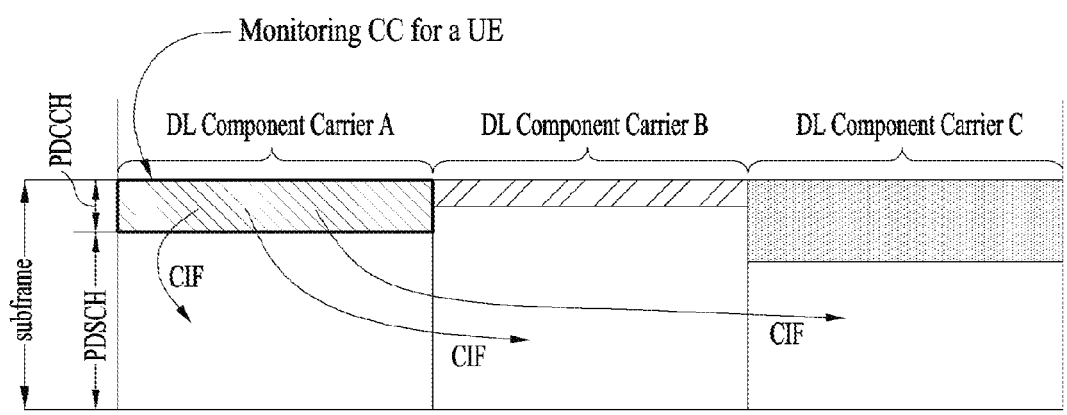

FIG. 18 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH, or may not be included in the DCI format transmitted through PDCCH. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 14, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling. When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 18, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

FIG. 19 shows communication environment to which the following description is applicable. As shown in FIG. 19, a D2D RUE may have a communication link (hereinafter, referred to as B_LINK as a meaning of a backhaul link) with an eNB (FIG. 19 (*a*)) or a D2D UE (D2D UE#T, FIG. 19 (*b*)) and a communication link (hereinafter, A_LINK as a meaning of an access link) with a different D2D UE. In this case, as an example, the D2D RUE can provide communication connectivity to a D2D UE located at the outside of coverage of a specific network node (e.g., eNB or D2D UE #T in FIG. 19). And, the D2D RUE performs B_Link transmission on a first component carrier and performs A_Link transmission on a second component carrier.

More specifically, the D2D RUE can determine transmit power to be used on a first component carrier and a second component carrier based on a TPC command received from an eNB. In this case, if the transmit power, which is determined based on the TPC command, to be used on the second component carrier becomes smaller than transmit power (the aforementioned minimum D2D transmit power) related to minimum coverage of D2D communication, D2D communication can be restricted. And, since the cellular signal transmission has higher priority in general, if predetermined transmit power (i.e., transmit power to be used on the first component carrier) is assigned to the cellular communication and then the remaining transmit power is assigned to the D2D communication, the D2D communication can be restricted.

As a method of securing minimum transmit power for D2D communication, it may be able to use power headroom report. Specifically, when a UE performs UL transmission to the eNB on a first component carrier and performs D2D transmission on a second component carrier, the UE may consider transmit power related to minimum coverage of D2D communication in calculating the power headroom. When the power headroom is calculated, the UE reports the remained headroom to the eNB in consideration of minimum transmit power x to make the eNB not ask power equal to or greater than (maximum transmit power−x) dBm. As an example, a legacy power headroom is represented as (Pcmax−currently used power), whereas the aforementioned scheme can be represented as (Pcmax−x−currently used power). Hence, the UE can report the (Pcmax−x−currently used power) as a power headroom report.

And, when a UE performs UL transmission to the eNB on a first component carrier and performs D2D transmission on a second component carrier, transmit power related to minimum coverage of the aforementioned D2D communication can be set to the UE. For example, if transmit power to be used on the second component carrier is smaller than the transmit power related to the minimum coverage, transmission can be performed on the second component carrier using the transmit power related to the minimum coverage rather than the transmit power determined by the TPC command. As a concrete example, if maximum transmit power of the UE corresponds to 23 dBm, x dBm is set to the A_LINK and maximum transmit power of the B_LINK can be configured by (23−x) dBm. This can be interpreted as priority for determining transmit power to be used on each component carrier after a TPC command is received.

The UE may report a fact that the UE performs the A_LINK or D2D transmission on a different CC to the eNB via a physical layer signal or a higher layer signal. It may be able to prevent the eNB from asking the UE to use transmit power equal to or greater than (maximum transmit power−x) dBm for the B_Link.

Meanwhile, the transmit power x secured for the A_LINK or whether or not minimum transmit power is secured can be differently configured according to a type of a D2D signal. In particular, a size of transmit power related to minimum coverage may vary according to a type of a D2D signal. For example, minimum secured power for transmitting D2DSS/PD2DSCH, SA, data and discovery can be differently configured. And, the minimum transmit power may not be secured for a specific D2D signal.

The minimum secured power according to a D2D signal or information on whether or not minimum transmit power is secured according to a D2D signal can be determined in advance. Or, the minimum secured power according to a D2D signal or information on whether or not minimum transmit power is secured according to a D2D signal can be autonomously determined by a D2D RUE, or can be determined by a report of a different D2D reception UE. In order to make an eNB know a minimum transmit power value or information on whether or not minimum transmit power is secured, the minimum secured power value or the information on whether or not minimum transmit power is secured can be signaled to a network via a physical layer signal or a higher layer signal. And, a minimum secured power according to a D2D signal type or information on whether or not minimum transmit power is secured can be signaled to a D2D RUE by a network via a physical layer signal or a higher layer signal. When the minimum secured power according to a D2D signal is signaled, the minimum secured power value according to a signal type can be individually signaled. Or, in order to reduce signaling overhead, average (minimum) power value is signaled and a predetermined offset according to each D2D signal can be applied to the average power value. The offset may correspond to a predetermined value or a value signaled via a physical layer/ higher layer signal. Or, the average power value can be determined in advance and an offset value or a value indicating the offset value can be signaled via a physical layer/higher layer signal.

The transmit power related to the minimum coverage of the D2D communication can be applied to transmission on the second component carrier under a predetermined condition.

First of all, if a signal transmitted on the first component carrier corresponds to a predetermined signal type, application of the transmit power related to the minimum coverage can be excluded. Examples of the predetermined signal type may include PUCCH, UCI (ACK/NACK, CQI, PMI), PRACH, and a VoIP signal configured by SPS (or all signals scheduled by SPS). In particular, in case of using all transmit power for the B_LINK, protection for D2D transmission can be terminated. If a UE uses all transmit power for the A_LINK, the UE may not transmit the B_LINK.

Secondly, the application of the transmit power related to the minimum coverage can be performed only when the sum of the A_LINK and the B_LINK arrives at the maximum transmit power of a UE. In case of using open loop power control for the A_LINK, although transmit power is configured to be lower than minimum secured power, transmission is performed by power configured by the open loop power control. The principle of securing minimum A_LINK coverage is identically applied to the aforementioned scheme when a UE arrives at the maximum transmit power. However, when it is able to achieve coverage with transmit power lower than the minimum secured power due to the good channel state of the A_LINK, the aforementioned scheme permits transmission transmitted by lower power.

If a first component carrier and a second component carrier are located at an intra-band (i.e., if a frequency space between the first component carrier and the second component carrier is equal to or less than a predetermined level or if hardware for transmitting and receiving the first component carrier and the second component carrier is able to be configured by a single RF chain), a difference between transmit powers of the two CCs is equal to or less than a predetermined threshold. Hence, if an eNB configures transmit power of the B_LINK to be high, transmit power of the A_LINK should be increased within a predetermined threshold. By doing so, it may be able to prevent out-band emission of a specific component carrier acting as interference to another CC or degrading EVM when the component carriers are close to each other on a frequency axis.

Yet, the aforementioned condition can be restrictively applied to intra-band CA only. The transmit power difference restriction may not be applied to inter-band (when a frequency space between the first component carrier and the second component carrier is equal to or greater than a predetermined level or when a separate RF chain is configured to transmit and receive the first component carrier and the second component carrier). Yet, as an exceptional case, it may be able to put a transmit power difference restriction on each component carrier according to a specific signal type in the inter-band as well. In particular, if the first and the second component carriers correspond to the inter-band and a signal transmitted on the first component carrier corresponds to a predetermined signal type, a difference between transmit power to be used for the first component carrier and transmit power to be used for the second component carrier may be equal to or less than a predetermined threshold. In this case, examples of the predetermined signal type include PUCCH, UCI, PRACH, and a VoIP signal configured by SPS (or all signals scheduled by SPS).

Figure 20:
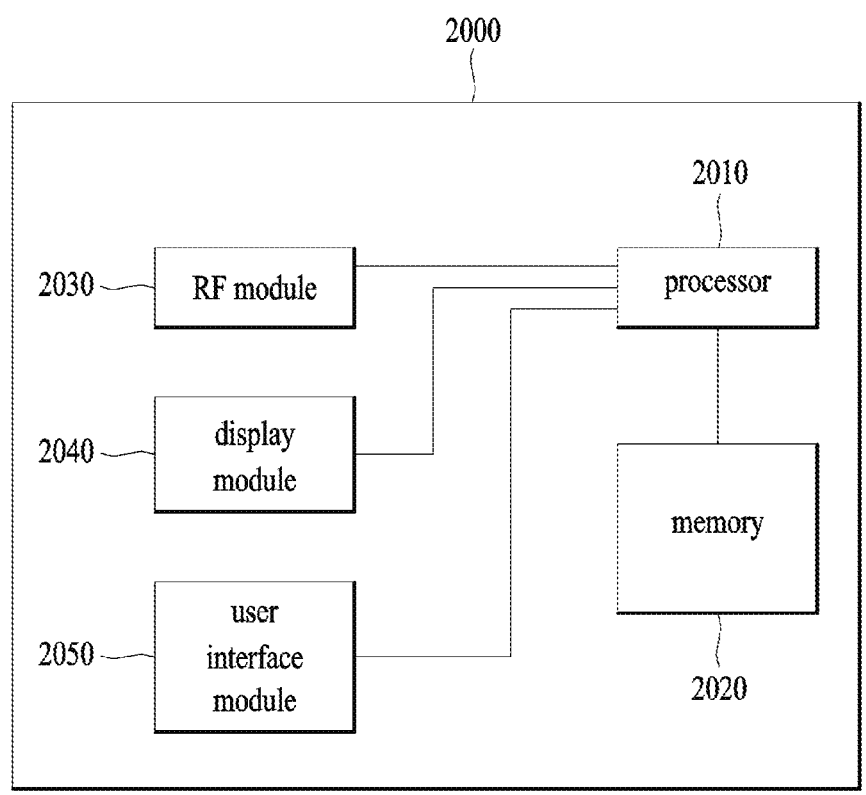
FIG. 20 is a block diagram for a communication device according to the present invention.

FIG. 20 is a block diagram for a communication device according to the present invention.

Referring to FIG. 20, the communication device 2000 includes a processor 2010, a memory 2020, an RF module 2030, a display module 2040, and a user interface module 2050.

The communication device 2000 is illustrated for convenience of description and some modules may be omitted. The communication device 2000 may further include necessary modules. In addition, some modules of the communication device 2000 may be subdivided. The processor 2010 is configured to perform operations according to the embodiment of the present invention that is exemplified with reference to the diagrams. In detail, a detailed operation of the processor 2010 would be understood with reference to FIGS. 1 to 16.

The memory 2020 is connected to the processor 2010 and stores an operating system, an application, a program code, data, etc. The RF module 2030 is connected to the processor 2010 and converts a baseband signal into a radio signal or converts a radio signal into a baseband signal. To this end, the RF module 2030 performs analog conversion, amplification, filtering, and frequency up-conversion, or inverse procedures thereof. The display module 2040 is connected to the processor 2010 and displays various pieces of information. The display module 2040 may use, but is not limited to, well-known elements such as a liquid crystal display (LCD), a light emitting diode (LED), and an organic light emitting diode (OLED). The user interface module 2050 may be connected to the processor 2010 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of determining transmit power for D2D communication in a wireless communication system and an apparatus therefor are described with reference to examples applied to 3GPP LTE system, it may be applicable to various kinds of wireless communication systems as well as the 3GPP LTE system.

What is claimed is:

1. A method of transmitting and receiving a signal by a user equipment (UE) in a wireless communication system supporting a direct communication between the UE and another UE, the method comprising:
receiving, by the UE from a base station, a signal indicating a minimum transmit power value for the direct communication;
calculating, by the UE, a power headroom,
wherein, when the UE performs an uplink transmission to the base station on a first component carrier and performs the direct communication on a second component carrier, the power headroom is obtained by subtracting the minimum transmit power value for the direct communication and a transmit power for the uplink transmission from a maximum transmit power for the UE; and
reporting, by the UE, the power headroom to the base station.

2. The method of claim 1, further comprising the steps of:
receiving a transmit power control (TPC) command from the base station; and
determining a transmit power for the direct communication and the transmit power for the uplink transmission based on the TPC command.

3. The method of claim 2, wherein, when the transmit power for the direct communication is smaller than the minimum transmit power value the minimum transmit power value is applied to the direct communication on the second component carrier.

4. The method of claim 3, wherein, when the uplink transmission includes a predetermined signal type, the minimum transmit power value is not applied to the direct communication.

5. The method of claim 4, wherein the predetermined signal type comprises a physical uplink control channel (PUCCH), uplink control information (UCI), a physical random access channel (PRACH), or a VoIP signal configured by semi persistent scheduling (SPS).

6. The method of claim 1, wherein, when the first component carrier and the second component carrier correspond to an intra-band, a difference between the transmit power for the uplink transmission and a transmit power for the direct communication is equal to or less than a predetermined threshold.

7. The method of claim 1, wherein, when the first component carrier and the second component carrier correspond to an inter-band and a signal transmitted on the first component carrier corresponds to a predetermined signal type, a difference between the transmit power for the uplink transmission and a transmit power for the direct communication is equal to or less than a predetermined threshold.

8. The method of claim 7, wherein the predetermined signal type comprises PUCCH, UCI, PRACH, or a VoIP signal configured by SPS.

9. A user equipment (UE) operating in a wireless communication system supporting a direct communication between the UE and another UE, the UE comprising:
a transmit device; and
a processor, the processor configured to:
receive, from a base station, a signal indicating a minimum transmit power value for the direct communication,
calculate a power headroom,
wherein when the UE performs an uplink transmission to the base station on a first component carrier and performs the direct communication on a second component carrier, the power headroom is obtained by subtracting the minimum transmit power value for the direct communication and a transmit power for the uplink transmission from a maximum transmit power for the UE, and
report the power headroom to the base station.

10. The UE of claim 9, wherein the processor is further configured to:
receive a transmit power control (TPC) command from the base station, and
determine a transmit power for the direct communication and the transmit power for the uplink transmission based on the TPC command.

11. The UE of claim 10, wherein, when the transmit power for the direct communication is smaller than the minimum transmit power value, the minimum transmit power value is applied to the direct communication on the second component carrier.

12. The UE of claim 11, wherein, when the uplink transmission includes a predetermined signal type, the minimum transmit power value is not applied to the direct communication.

13. The UE of claim 12, wherein the predetermined signal type comprises a physical uplink control channel (PUCCH), uplink control information (UCI), a physical random access channel (PRACH), or a VoIP signal configured by semi persistent scheduling (SPS).

14. The UE of claim 9, wherein, when the first component carrier and the second component carrier correspond to an intra-band, a difference between the transmit power for the uplink transmission and a transmit power for the direct communication is equal to or less than a predetermined threshold.

15. The UE of claim 9, wherein, when the first component carrier and the second component carrier correspond to an inter-band and a signal transmitted on the first component carrier corresponds to a predetermined signal type, a difference between the transmit power for the uplink transmission and a transmit power for the direct communication is equal to or less than a predetermined threshold.

16. The UE of claim 15, wherein the predetermined signal type comprises PUCCH, UCI, PRACH, or a VoIP signal configured by SPS.

* * * * *